United States Patent [19]
Pedersen et al.

[11] 3,787,724
[45] Jan. 22, 1974

[54] VOLTAGE CONTROL OF AN A.C. DRIVE SYSTEM DURING MOTOR STARTING

[75] Inventors: Niels P. Pedersen, Waterford; Henry L. Schultz, Jr., Erie, both of Pa.

[73] Assignee: General Electric Company, Salem, Va.

[22] Filed: Apr. 17, 1973

[21] Appl. No.: 351,824

[52] U.S. Cl................ 318/410, 318/230, 318/231
[51] Int. Cl. ............................................ H02p 1/04
[58] Field of Search... 318/171, 227, 230, 231, 410, 318/413, 416, 440, 459

[56] References Cited
UNITED STATES PATENTS
3,594,623   7/1971   Lamaster ...................... 318/230 X Primary Examiner—Gene Z. Rubinson
Attorney, Agent, or Firm—Arnold E. Renner et al.

[57] ABSTRACT

Method and apparatus for providing adequate break-away torque for the a-c motors being started in a system in which a source of adjustable voltage a-c electric power such as an inverter supplies electric power to the motors being started. The output voltage of the source is substantially increased in a non-abrupt manner for an initial predetermined starting period to provide adequate break-away torque, the voltage thereafter being reduced to a level corresponding to a predetermined desired constant ratio relative to output frequency.

15 Claims, 5 Drawing Figures

VOLTAGE CONTROL OF AN A.C. DRIVE SYSTEM DURING MOTOR STARTING

BACKGROUND OF THE INVENTION

1. Field of the Invention

This invention relates to a-c drive systems of the type in which a-c motors are supplied with electric power from an adjustable frequency, adjustable voltage electric power source and, more particularly, to the control of such drives in a manner such that one or more motors may be rapidly started and efficiently operated after starting.

2. Description of the Prior Art

It is often desirable that the motor of an electric drive system operate continuously without significant speed fluctuations. This is particularly true in case of certain process applications of drive systems. By utilizing an adjustable frequency, adjustable voltage source such as an inverter or cycloconverter, the operating speeds of a-c motors can be adjusted to provide the operating speeds required by the drive application. Where this type of power source is used, heating of the motors during operation can become a significant problem due to harmonic content in the electric power supplied to the motors. This heating can be somewhat alleviated by maintaining the output voltage of the source at the lowest level consistent with operation of the motors. More particularly, for satisfactory operation, it is known that the voltage and frequency of the electric power supplied to the motor should be maintained at a predetermined constant ratio. Thus, referring to FIG. 2, an a-c motor is found to operate most satisfactorily during normal operation when voltage and frequency are maintained at a constant ratio as represented by the line segment A-B.

If, however, it is desired to start a motor, particularly a hot synchronous motor of the synchronous reluctance type, the constant voltage to frequency ratio represented by the line segment O-A of FIG. 2 may be insufficient to provide adequate break-away torque at low voltages and frequencies. This problem has long been recognized, and one approach to overcome the problem is illustrated by line C-D-E of FIG. 2. As represented by this line, the voltage is increased by a set amount over that called for by the desired voltage to frequency ratio, this increase being sufficient to provide adequate break-away torque and being maintained throughout operation of the drive system. This approach has not been altogether satisfactory in that it provides excessive voltage and still more heating of the motors at normal operating speeds. As a result, still higher voltages are often needed for subsequent starts.

It has therefore been suggested in the past that the output voltage be increased only for the period of time required for starting the motors and that the output voltages thereafter be returned to a lower level corresponding to the desired ratio. In this way, motors can be reliable started without subjecting the motors to excessive steady state heating. This approach to motor starting is illustrated by line segments O-C-F-A-B of FIG. 2 and has heretofore been implemented by providing an interlock with the starting means for the motors, the interlock operating through the regulating system for the source (see FIG. 1) to increase the output voltage for a predetermined period. Unfortunately, it has been found in practice that the abrupt increase in voltage represented by line segment O-C of FIG. 2 is often sufficient to signal an overvoltage condition in the power source, particularly when the power source is an inverter, and to cause the drive system to shut itself down. To program the drive system to ignore such voltage increases at starting, but not at other operating conditions, would be to increase the expense and complexity of the drive system and to possibly reduce overall reliability.

SUMMARY OF THE INVENTION

Accordingly, it is a primary object of this invention to provide improved means for assuring rapid and reliable starting of motors in an a-c drive system in which the motors are connected to a source of adjustable frequency, adjustable voltage electric power.

Another object of this invention is to provide improvided means for providing adequate break-away torque for a-c motors while maintaining a desired ratio of voltage to frequency at normal motor operating speeds.

Yet another object of this invention is to provide improved means for providing adequate break-away torque for a-c motors during starting without creating an overvoltage condition in the drive system.

Still another object is to provide the foregoing objects without requiring the use of expensive and complex control circuitry.

Briefly stated, in carrying out the invention in one form, an a-c drive system including a source of adjustable frequency, adjustable voltage electric power and at least one a-c motor coupled to the source for receiving electric power therefrom is provided with control means for facilitating rapid and reliable starting of the motors. The control means includes first signal generating means for generating a speed signal which increases in a predetermined gradual manner from a base level to a level corresponding to a desired motor speed over an acceleration period and second signal generating means for generating a boost signal having an initial non-abrupt increase from a base level followed by a non-abrupt decrease back to the base level over a boost period substantially shorter than the acceleration period. The control means also includes regulating means having frequency control means for regulating the output frequency and voltage control means for regulating the output voltage of the source, the frequency control means and the voltage control means being responsive to identical input signals to produce a desired substantially constant ratio of output voltage to output frequency. In accordance with the invention, the control means includes coupling means for simultaneously initially supplying both the speed signal and the boost signal to the regulating means, the speed signal being supplied to both the frequency and voltage control means and the boost signal being supplied to only the voltage control means. In this manner, the ratio of output voltage to output frequency is boosted during the initial portion of the acceleration period to provide adequate break-away torque for satisfactory motor starting. The ratio of output voltage to output frequency is thereafter maintained at the desired constant ratio.

By a further aspect of the invention, the coupling means includes interlocked switching means for simultaneously initially supplying both the speed signal and the boost signal to the regulating means. The interlocked switching means preferably includes time delayed switching means for removing the boost signal from the regulating means after a predetermined period. By a still further aspect of the invention, the second signal generating means comprises a circuit having at least one reactive element therein, preferably a capacitor, for producing an exponentially varying boost signal.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
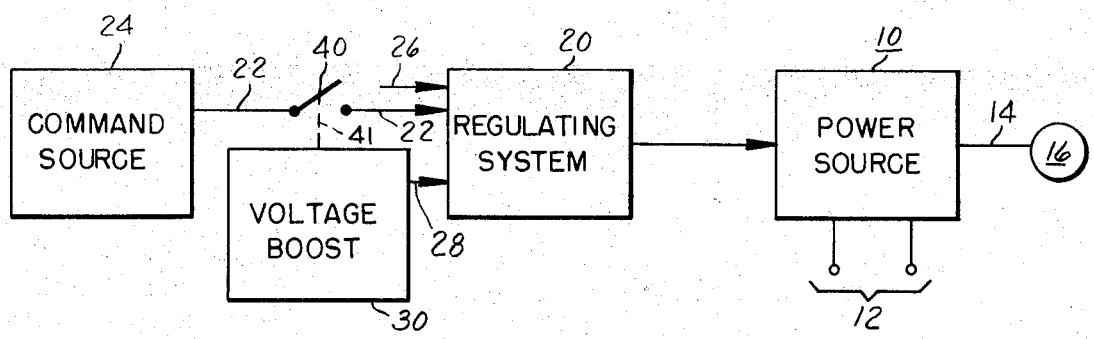
FIG. 1 is a block diagram of an a-c drive system including the present invention.

A drive system incorporating the present invention is illustrated by FIG. 1, the drive system including a source 10 of adjustable frequency, adjustable voltage electric power. The power source 10 is preferably a static inverter for converting electric power from a d-c source 12 to three-phase adjustable frequency, adjustable voltage electric power on output phase conductors represented by line 14. The source 10 may, however, take on other forms such as a cycloconverter for converting a-c electric power to adjustable frequency, adjustable voltage electric power. The source 10 may supply single phase as well as three-phase electric power.

The output conductors 14 are connected to at least one three-phase synchronous motor 16. While only one motor 16 is illustrated, it is typical for a single source 10 to supply more than one motor, and it will therefore be appreciated that the single motor 16 is representative of one or more a-c motors connected to a single source of adjustable frequency, adjustable voltage electric power.

Let it now be assumed that a regulating system 20 controls the output frequency of the source or inverter 10 such that the synchronous speed of the motor 16 is normally established in accordance with the magnitude of a command signal 22 from a command source 24 and appropriate feedback signals 26 forming no part of the present invention. The output voltage of the inverter 10 is also controlled by the regulating system 20 in response to the signals 22 and 26 and, under starting conditions only, by a boost signal 28 generated by a voltage boost signal generator 30 in accordance with this invention.

Figure 4:
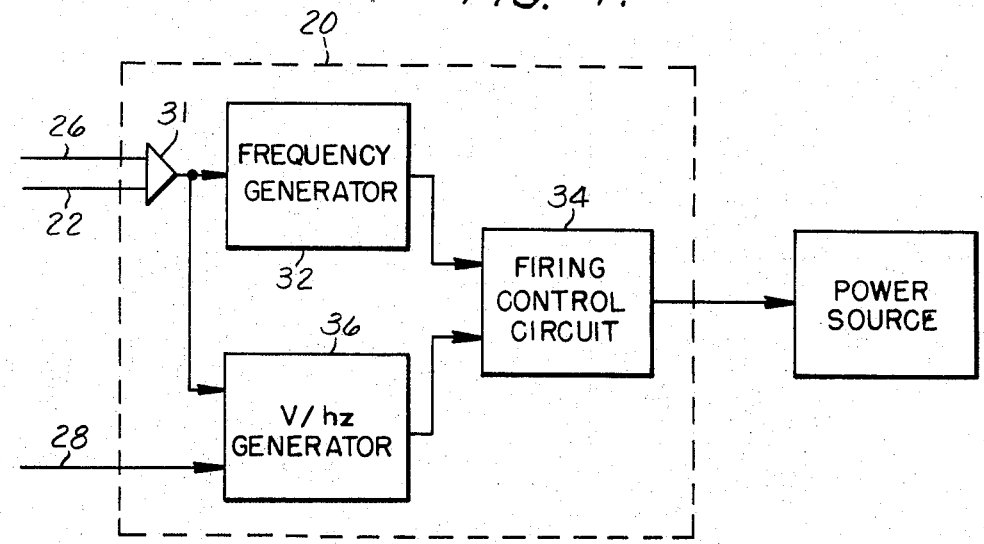
FIG. 4 is a more detailed block diagram of the regulating system of FIG. 1.

Before proceeding to a discussion as to how the present invention provides enhanced break-away torque during starting without producing undue heating during normal operation or excessive starting voltage, attention is directed to FIG. 4 for a brief discussion of the basic functions performed by the regulating system 20.

For a more detailed description, attention is directed to U.S. Pat. No. 3,694,718, entitled "Methods of Inverter Voltage Control by Superimposed Chopping," issued on Sept. 26, 1972 in the names of Carlton E. Graf and Werner K. Volkmann and assigned to the assignee of this invention. As illustrated, the regulating system 20 responds to a command signal 22 from the command source 64, the magnitude of the command signal 22 representing a desired speed for the motor 16. This command signal 22 is used along with other feedback signals 26 passing through an operational amplifier 31 in a frequency generator 32 and a firing control circuit 34 to establish the fundamental output frequency of the power source 10. Thus, the frequency generator 32 effectively establishes the operating speed of the motor 16 in accordance with the magnitudes of the signals 22 and 26. Furthermore, since the signals 26 are feedback or correcting signals, it will be appreciated that the command signal 22 is a speed signal since the speed of the motor 16 will vary in response to changes in the command signal 22.

The output of the operational or command amplifier 31 is also supplied to a voltage control circuit 36, which in the absence of any other input signal is operative with the firing control circuit 34 to maintain the output voltage of the source 10 at a predetermined multiple of the output or fundamental frequency. In other words, when the command signal 22 is the only operative input signal (signals 26 being of a corrective nature), the regulating system 20 is effective to maintain the ratio of output voltage to output frequency of the source 10 at a substantially constant value.

Figure 3:
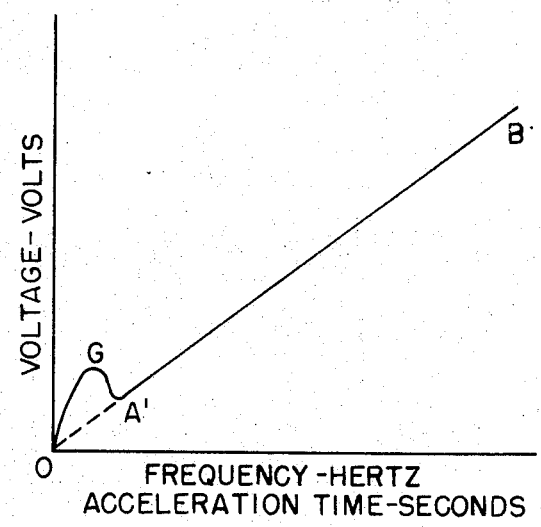
FIG. 3 is a diagrammatic illustration of the voltage to frequency relationship provided during motor starting in the drive system of FIG. 1.

Referring now to FIGS. 1 and 3 and ignoring for the moment the voltage boost generator 30 of this invention, let it be assumed that the motor 16 is at rest and it is desired to start the motor and to accelerate it to a desired speed corresponding to point B' of FIG. 3. This would ordinarily be accomplished by supplying command signal 22 to the regulating system 20 by means of closing appropriate switching means indicated in FIG. 1 by a manually operated switch 40. The command signal will ordinarily build up at a desired rate corresponding to a desired acceleration schedule; commonly, the command or speed signal will build up over a predetermined period of time along the line segment O-A'-B' of FIG. 3. This acceleration period may typically amount to as much as 2 to 30 seconds and in some applications may even be as long as a minute or more. If we assume that the abscissa of FIG. 3 represents time, as well as frequency, during the start-up period, it will be seen that the voltage available initially during the period the speed signal is moving in magnitude from O to A' may be insufficient to provide adequate break-away torque. The present invention provides a way of rapidly, but non-abruptly, increasing the voltage during this initial acceleration period without adversely affecting the desired ratio of voltage to frequency during normal motor operation as represented in FIG. 3 by line segment A'-B'.

Figure 5:
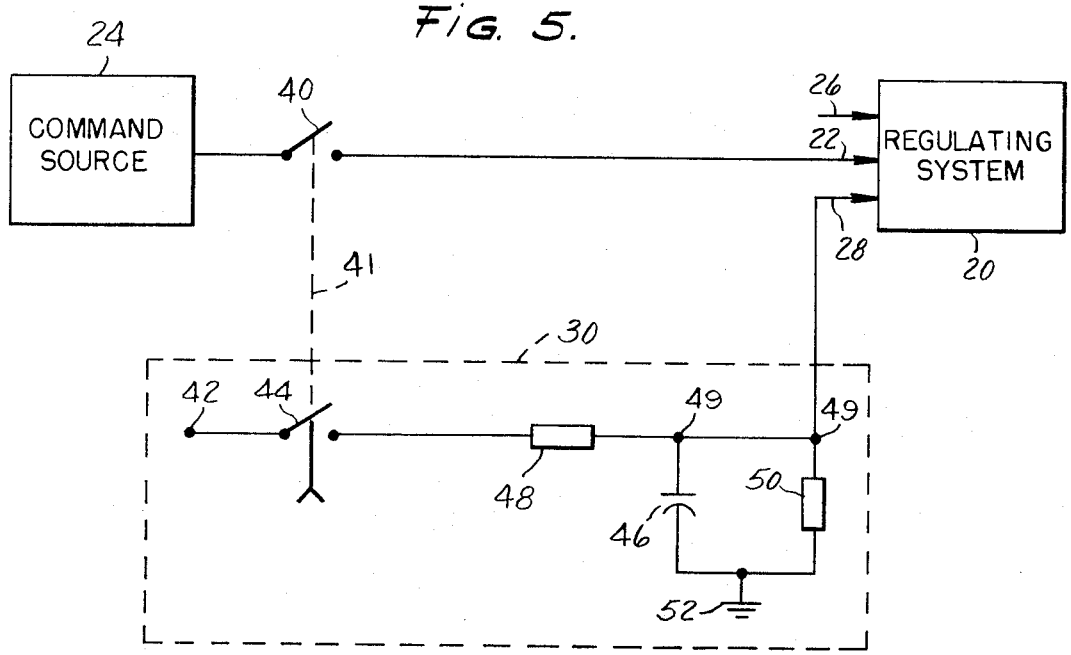
FIG. 5 is a circuit diagram of a preferred embodiment of the voltage boost signal generator of FIG. 1.

Turning attention now to FIGS. 1 and 5, the voltage boost generator 30 includes an input terminal 42 for connection to source of appropriately poled d-c power, normally open switching means 44, a capacitor 46, and a pair of resistors 48 and 50. The switching means 44 is of a time delay type arranged so as to automatically open a predetermined set period of time after being closed, the switching means being connected to the switching means 40 by an interlock arrangement 41 such that closing of the switch 40 will automatically close switch 44. After the predetermined delay period, switch 44 opens again without having an effect on switch 40. Such switching arrangements are well known in the art and will, therefore, not be described in detail in this specification. The elements just described are arranged such that the terminal 42 is connected through switch 44 to the resistor 48, which is connected through junction 49 to ground 52 through both capacitor 46 and resistor 50. Resistor 48 is also connected to the regulating system 20 through junction 49 to supply the boost signal 28 thereto.

Let it now be assumed that switch 40 is closed to supply the command or speed signal 22 to the regulating system 20. Closure of switch 40 also results in simultaneous closure of the switch 44 through action of the interlock means 41. As a result, capacitor 46 begins to charge at an exponential charging rate toward the voltage of the d-c source connected to terminal 42. The changing voltage at junction 49 is transmitted to regulating system 20 as boost signal 28. After the predetermined set period, switch 44 opens automatically to remove the d-c source at terminal 42 from the voltage boost circuit. As a result, capacitor 46 begins to discharge exponentially back to level of ground or common 52.

Referring now to FIGS. 1, 3, 4, and 5, it will be seen that the closure of switch 40 will effectively supply the command or speed signal to both the frequency generator 32 and the voltage generator 36. Simultaneously, boost signal 28 will be supplied to only the voltage control means 36. As a result, the output or fundamental frequency of the power source 10 will increase over the entire acceleration period along a path represented by the line O–A'–B'. Since, however, the voltage control means sees both the speed signal 22 and the much shorter boost signal 28, the output voltage of the source 10 will increase over the entire acceleration period along a path represented by O–G–A'–B'. It will be seen that this approach provides a substantial voltage boost for break-away torque during the initial portion of the acceleration period without, however, adversely affecting the desired voltage to frequency ratio during most of the acceleration period. Due to the exponential increase and decrease of the voltage boost signal 28, the voltage rise during the initial period, or boost period, of the acceleration period is not sufficient to indicate an overvoltage condition.

It will, of course, occur to those skilled in the art that the boost period may be conveniently varied relative to the acceleration period through appropriate selection of the time delay of the switching means 44 and the value of the elements 46, 48, and 50. In one embodiment of the invention where the acceleration period was 10 seconds, it was desired that the boost period be 2 seconds. To accomplish this, a switch 44 with a time delay of 1 ½ seconds was selected in combination with a capacitor of 2 microfarads and resistors of 500,000 and 100,000 ohms, respectively. Individuals skilled in the art will readily appreciate that the boost period relative to the acceleration period may be varied through appropriate selection of the elements. Under unusual conditions, it may even be desirable for the boost period to be as long as the acceleration period. Similarly, it will occur to those siilled in the art that other circuits, particularly reactive circuits, may be used to generate the boost signal.

From the foregoing, it will be seen that this invention provides improved means for assuring rapid and reliable starting of motors in adjustable frequency, adjustable voltage drive systems in which the motors being started are connected to a single source of electric power. Furthermore, the rapid and reliable starting is accomplished in accordance with the invention by providing adequate break-away torque without resulting in excessive subsequent motor heating due to operation at excessive voltage levels, without requiring the use of expensive and complex control circuitry, and without applying excessive initial voltage.

While the invention has been particularly shown and described with reference to a preferred embodiment thereof, it will be understood by those skilled in the art that various changes in form, details, and application may be made therein without departing from the spirit and scope of the invention. Although the invention has been suggested for use in a polyphase drive system, it is equally applicable to single phase systems. Similarly, it will be obvious that the invention is applicable to adjustable frequency, adjustable voltage drive systems utilizing a-c power sources other than inverters. Accordingly, it is intended that all such modifications and changes be included within the scope of the appended claims.

What is claimed as new and is desired to secure by Letters Patent of the United States is:

1. Control means for use in an a-c drive system including a source of adjustable frequency, adjustable voltage electric power and at least one a-c motor coupled to the electric power source for receiving electric power therefrom, said control means comprising:

first signal generating means for generating a speed signal over an acceleration period, the speed signal increasing in a predetermined gradual manner from a base level to a level corresponding to a desired motor speed, second signal generating means for generating a boost signal having an initial non-abrupt increase from a base level followed by a non-abrupt decrease back to the base level over a boost period, regulating means coupled to the electric power source, said regulating means including frequency control means for regulating the output frequency of the electric power source and voltage control means for regulating the output voltage of the electric power source, said frequency control means and said voltage control means being responsive to increasing input signals to increase output voltage and output frequency and being responsive to identical input signals to produce a desired substantially constant ratio of output voltage to output frequency, coupling means for simultaneously initially supplying both the speed signal and the boost signal to said regulating means, said coupling means further including means for supplying the speed signal to both said frequency control means and said voltage control means and for supplying the boost signal to said voltage control means, whereby the ratio of output voltage to output frequency is boosted during the initial portion of the acceleration period to provide adequate break-away torque and whereby the ratio of output voltage to output frequency thereafter is maintained at the desired constant ratio.

2. Control means as defined by claim 1 in which the boost period is substantially shorter than the acceleration period.

3. Control means as defined by claim 2 in which said coupling means includes interlocked switching means for simultaneously initially supplying both the speed signal and the boost signal to said regulating means.

4. Control means as defined by claim 2 in which said second signal generating means comprises a circuit having at least one reactive element for producing the boost signal.

5. Control means as defined by claim 4 in which said reactive element is a capacitor.

6. Control means as defined by claim 3 in which said interlocking switching means includes time delayed switching means for removing the boost signal from said regulating means after a predetermined period.

7. Control means as defined by claim 6 in which said second signal generating means comprises a circuit having at least one reactive element for producing the boost signal.

8. Control means as defined by claim 7 in which said reactive element is a capacitor.

9. An a-c drive system comprising:
a source of adjustable frequency, adjustable voltage electric power,
at least one a-c motor coupled to said electric power source for receiving electric power therefrom,
control means comprising:
first signal generating means for generating a speed signal over an acceleration period, the speed signal increasing in a predetermined gradual manner from a base level to a level corresponding to a desired motor speed,
second signal generating means for generating a boost signal having an initial non-abrupt increase from a base level followed by a non-abrupt decrease back to the base level over a boost period substantially shorter than the acceleration period,
regulating means coupled to said electric power source, said regulating means including frequency control means for regulating the output frequency of said electric power source and voltage control means for regulating the output voltage of said electric power source, said frequency control means and said voltage control means being responsive to increasing input signals to increase output voltage and output frequency and being responsive to identical input signals to produce a desired substantially constant ratio of output voltage to output frequency,
coupling means for simultaneously initially supplying both the speed signal and the boost signal to said regulating means, said coupling means further including means for supplying the speed signal to both said frequency control means and said voltage control means and for supplying the boost signal to said voltage control means,
whereby the ratio of output voltage to output frequency of said electric power source is boosted during the initial portion of the acceleration period to provide said a-c motor with adequate breakaway torque and whereby the ratio of output voltage to output frequency thereafter is maintained at the desired constant ratio.

10. An a-c drive system as defined by claim 9 in which said a-c motor is a synchronous motor.

11. An a-c drive system as defined by claim 9 wherein the boost signal increases and decreases exponentially.

12. An a-c drive system as defined by claim 9 in which said coupling means includes interlocked switching means for simultaneously initially supplying both the speed signal and the boost signal to said regulating means.

13. An a-c drive system as defined by claim 12 in which said second signal generating means comprises a circuit having at least one reactive element for producing the boost signal.

14. An a-c drive system as defined by claim 13 in which said reactive element is a capacitor.

15. An a-c drive system as defined by claim 12 in which said interlocked switching means includes time delayed switching means for removing the boost signal from said regulator means after a predetermined period.

* * * * *

PO-1050
(5/69)

United States Patent Office
CERTIFICATE OF CORRECTION

Patent No. 3,787,724          Dated January 22, 1974

Inventor(s) Niels P. Pedersen and Henry L. Schultz, Jr.

Figure 2:
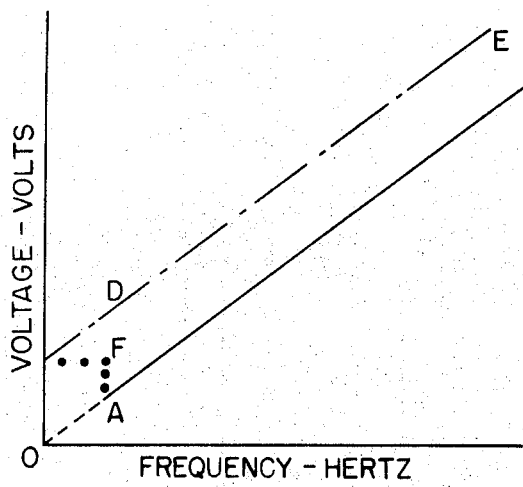
FIG. 2 is a diagramatic illustration of the voltage to frequency relationships provided in prior art drive systems during motor starting.

It is certified that error appears in the above-identified patent and that said Letters Patent are hereby corrected as shown below:

Fig. 2 of drawing, add reference character "C" to indicate intersection of line segment DE with the vertical axis.

Column 4, line 8, cancel "64" and substitute --24--.
Column 4, line 62, after "power," insert --a--.
Column 5, line 36, after "O-A'-B'" insert --(Fig. 3)--.
Column 6, line 56, after "quency," insert --and--.
Column 6, line 63, after "means" cancel ",".
Column 7, line 30, after "therefrom," insert --and--.
Column 8, line 9, after "frequency," insert --and--.
Column 8, line 16, after "means" cancel ",".

Signed and sealed this 16th day of July 1974.

(SEAL)
Attest:

McCOY M. GIBSON, JR.
Attesting Officer

C. MARSHALL DANN
Commissioner of Patents